United States Patent
Alexander (10) Patent No.: US 8,688,144 B1
(45) Date of Patent: Apr. 1, 2014

(54) METHOD AND APPARATUS TO CONFIGURE MOBILE COMMUNICATION AND APPLICATIONS

(75) Inventor: Danny Alexander, Neve Efraim Monoson (IL)

(73) Assignee: Marvell International Ltd., Hamilton (BM)

( * ) Notice: Subject to any disclaimer, the term of this patent is extended or adjusted under 35 U.S.C. 154(b) by 674 days.

(21) Appl. No.: 12/555,346

(22) Filed: Sep. 8, 2009

Related U.S. Application Data (60) Provisional application No. 61/095,474, filed on Sep. 9, 2008.

(51) Int. Cl.
*H04W 24/00* (2009.01)

(52) U.S. Cl.
USPC ............... 455/456.3; 455/456.5; 455/456.1; 455/456.4

(58) Field of Classification Search
USPC ............ 455/456.1–457, 404.2, 432.1–434, 455/435.1–435.3; 340/539.13, 988–996; D10/104.2
See application file for complete search history.

(56) References Cited

U.S. PATENT DOCUMENTS

| | | | |
|---|---|---|---|
| 5,235,633 A * | 8/1993 | Dennison et al. | 455/456.3 |
| 7,130,644 B2 * | 10/2006 | Kuwahra et al. | 455/456.3 |
| 8,160,613 B2 * | 4/2012 | Handforth et al. | 455/456.3 |
| 2004/0224691 A1 * | 11/2004 | Hadad | 455/442 |
| 2005/0192030 A1 * | 9/2005 | Asthana et al. | 455/456.6 |
| 2007/0202875 A1 * | 8/2007 | Dorsey et al. | 455/434 |
| 2008/0227456 A1 * | 9/2008 | Huang et al. | 455/436 |
| 2009/0003279 A1 * | 1/2009 | Abusch-Magder et al. | 370/331 |

OTHER PUBLICATIONS

U.S. Appl. No. 12/124,682, filed May 21, 2008; Self Learning Roaming Optimization; Olaf Mater et al.

* cited by examiner

*Primary Examiner* — Ronald Eisner (57) ABSTRACT

Aspects of the disclosure provide methods and apparatuses to configure mobile communication and applications based on location detection. A method for operating a mobile terminal includes storing operational configurations in association with locations in the mobile terminal, detecting a location of the mobile terminal, determining an operational configuration based on the detected location, and configuring the mobile terminal according to the determined operational configuration. The operational configurations include communication configurations and application configurations.

20 Claims, 5 Drawing Sheets

METHOD AND APPARATUS TO CONFIGURE MOBILE COMMUNICATION AND APPLICATIONS

INCORPORATION BY REFERENCE

This application claims the benefit of U.S. Provisional Application No. 61/095,474, "Using GPS Location Information to Configure and Optimize Cellular Phone Communication" filed on Sep. 9, 2008, which is incorporated herein by reference in its entirety.

BACKGROUND

Mobile terminals, such as mobile phones, personal data assistants, and the like, can include various programming applications and communication features, such as video calls, emailing, web browsing, and the like, to suit user mobile communication demands.

SUMMARY

Aspects of the disclosure provide methods and apparatuses to configure mobile communication and applications based on location detection. In an embodiment, a mobile terminal includes a global positioning system (GPS) receiver to detect a location of the mobile terminal. Further, the mobile terminal configures mobile communication and applications according to the detected location. The location based mobile communication and application configuration improves various aspects of the mobile communication, such as reducing a start-up time to camp on a public land mobile network (PLMN), reducing noises due to neighbor cell interference, saving power, improving user experience, and the like.

According to the disclosure, a method for performing mobile communication includes storing operational configurations in association with locations in a mobile terminal, detecting a location of the mobile terminal, determining an operational configuration based on the detected location, and configuring the mobile terminal according to the determined operational configuration.

To store the operational configurations in association with the locations, the method includes storing a network topology associating cells with the locations. Further, the method includes determining a cell for camping on a public land mobile network (PLMN) based on the network topology. Then, the method includes synchronizing to a frequency of the determined cell, and registering with the determined cell to camp on the PLMN.

To determine the operational configuration based on the detected location, the method includes determining a neighbor cell based on the network topology. Then, the mobile terminal performs a neighbor cell measurement for the neighbor cell. In addition, the method includes determining a neighbor cell interference cancellation configuration based on the network topology.

In an embodiment of the disclosure, the mobile terminal receives the network topology from a service carrier. In another embodiment of the disclosure, the mobile terminal learns the network topology and updates the network topology when changes are detected. For example, the method includes frequency-scanning at the location to detect a plurality of frequencies used by a plurality of cells, synchronizing to a frequency used by a cell, receiving cell information of the cell, determining the cell for a radio connection based on the received cell information, and updating the network topology with the determined cell and the detected location.

According to an aspect of the disclosure, the method includes storing the cells and the associated locations in a look-up table.

In addition to storing the network topology, the method includes storing a power configuration, an email configuration, a ring tone configuration, and a service carrier configuration in association with the locations.

To detect the location of the mobile terminal, the method includes receiving a global positioning system (GPS) signal, and detecting the location based on the GPS signal.

Aspects of the disclosure provide a mobile terminal. The mobile terminal includes a memory unit, a location detector and a controller. The memory unit stores operational configurations in association with locations. The location detector detects a location of the mobile terminal. The controller determines an operational configuration based on the detected location, and configures the mobile terminal according to the determined operational configuration. Further, the mobile terminal includes a transceiver module to receive and transmit radio signals. In addition, the mobile terminal includes a global positioning system (GPS) configured to detect the location based on received satellite signals.

In an embodiment, the memory unit stores a network topology associating cells with the locations. Then, the controller determines a cell for camping on a public land mobile network (PLMN) based on the network topology, and configures the transceiver module to receive radio signals from the determined cell and transmit radio signals to the determined cell.

In addition, the controller determines a neighbor cell based on the network topology and determines a neighbor cell interference cancellation configuration based on the network topology.

In an embodiment, the mobile terminal learns the network topology and updates the network topology when changes are detected. In an example, the transceiver frequency-scans at the location to detect a plurality of frequencies used by a plurality of cells, and synchronizes to a frequency used by a cell to receive cell information. Then, the controller determines the cell for camping on a public land mobile network (PLMN) based on the received cell information, and updates the network topology stored in the memory unit with the determined cell and the location.

According to an aspect of the disclosure, the memory unit includes a look-up table to store the network topology. In addition, the memory unit stores a power configuration, an email configuration, a ring tone configuration, a service carrier configuration, and the like, in association with the locations.

In an embodiment, a method for operating a mobile terminal includes storing application configurations in association with locations in a mobile terminal, detecting a location of the mobile terminal, determining an application configuration based on the detected location, and configuring the mobile terminal according to the determined application configuration.

The mobile terminal stores various application configurations in association with locations in the mobile terminal. In an example, the mobile terminal stores a selection of software applications in association with locations. In another example, the mobile terminal stores a configuration of a selected software application in association with locations. In another example, the mobile terminal stores a selection of hardware components in association with locations. In another example, the mobile terminal stores a selection of email servers in association with locations. In another example, the mobile terminal stores an email configuration in association with locations. In another example, the mobile terminal stores a printing configuration in association with locations. In another example, the mobile terminal stores a call forwarding configuration in association with locations. In another example, the mobile terminal stores a ring tone configuration in association with locations. In another example, the mobile terminal stores a user preference in association with locations.

Further, to detect the location of the mobile terminal, the method can include receiving a global positioning system (GPS) signal and detecting the location based on the GPS signal. Alternatively, the mobile terminal can receive location information of the mobile terminal from another device, such as via a BLUETOOTH connection. In another example, when the mobile terminal has already registered in a network, the mobile terminal determines the location based on signal measurements and/or network processing.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
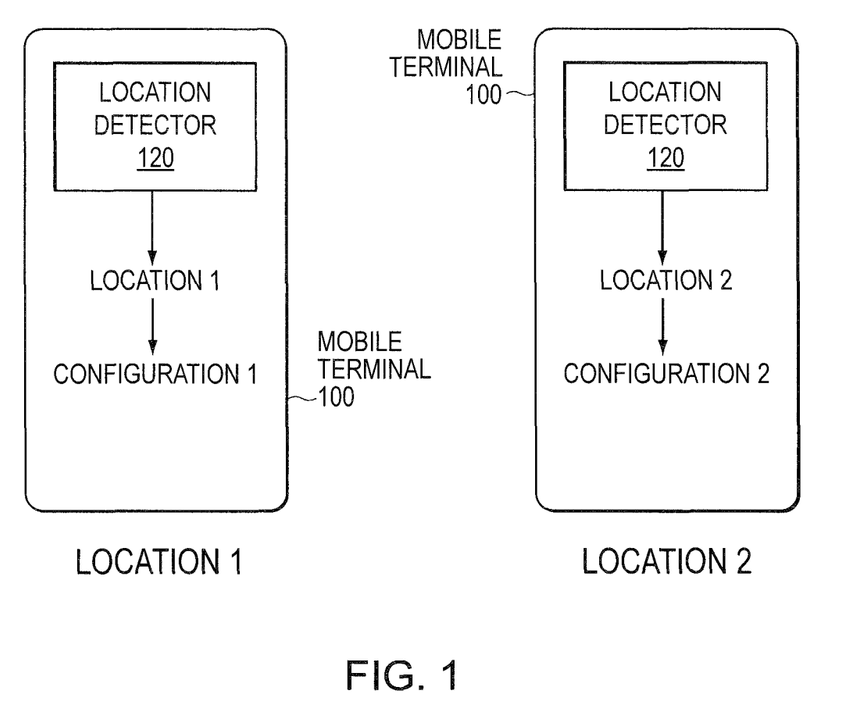
FIG. 1 shows a mobile terminal example performing a location based mobile communication according to an embodiment of the disclosure.

FIG. 1 shows a mobile terminal example 100 performing a location based mobile communication according to an embodiment of the disclosure. In accordance with an embodiment of the disclosure, the mobile terminal 100 is any suitable mobile device, such as a mobile phone, a personal data assistant, a handheld device, a laptop computer, a camera, a printer, an external hard drive, a media device, and the like. In accordance with an embodiment of the disclosure, the mobile terminal 100 is configured to communicate with a telecommunications network, for instance by camping on a public land mobile network (PLMN) to perform mobile communication. Alternatively, or additionally, the mobile terminal 100 is suitably configured to communicate with other wireless devices, such as wireless access points to a network, wireless enabled computer peripherals and other suitable wireless enabled electronic equipment.

For ease of understanding key teaching principles of this disclosure, the mobile terminal 100 is described herein in the context of a mobile terminal, such as user equipment compatible for use on a cellular network, although other suitable mobile terminals may be used. Generally, in accordance with an embodiment of the disclosure, a PLMN includes a plurality of base stations distributed in a service area. A base station can form a radio zone called a cell providing an air interface for radio communications between a mobile terminal, such as the mobile terminal 100, and the based station. When the mobile terminal 100 is within a cell, the mobile terminal 100 registers with the base station of the cell to camp on the PLMN. The PLMN interconnects with other PLMNs and/or other communication service agencies, such as public switched telephone networks (PSTN), internet service providers, and the like, to provide suitable communication services to the mobile terminal 100.

In accordance with an embodiment, the mobile terminal 100 includes a location detector 120 that detects the location of the mobile terminal 100. Further, the mobile terminal 100 performs mobile communication based on the detected location. In accordance with an embodiment, the mobile terminal 100 adjusts various operational aspects, such as mobile communication configuration, application software programs, communication channels, hardware, and the like, based on the detected location.

In FIG. 1 example, when the mobile terminal 100 is at location 1, for example, a work place for the user, the location detector 120 detects suitable coordinates, and identifies the work place. Then, in accordance with an embodiment, the mobile terminal 100 is configured to have an operational configuration that is appropriate for the work place. In an example, the mobile terminal 100 determines a cell in association with the work place. Then, the mobile terminal 100 registers with a base station of the cell and camps on to a preferred PLMN. In another example, the mobile terminal 100 performs a neighbor cell measurement in association with the work place. In another example, the mobile terminal 100 performs an interference noise cancellation in association with the work place. In another example, the mobile terminal 100 automatically selects and loads one or more software packages for use at the work place. In accordance with an embodiment, the selected software packages for the work place are different than software packages that are selected and loaded when the mobile terminal 100 is at a different location, for example at home. In another example, the mobile terminal 100 associates itself with a work access point and provides appropriate security codes.

Additionally, in accordance with an embodiment, the mobile terminal 100 adjusts application-level configurations in association with the work place. For example, in an embodiment, the mobile terminal 100 is configured to forward calls to a desktop work phone, stop email notifications, and the like, to adapt to the work place. In another example, at the work place, the mobile terminal 100 selects a work email server, and accesses the work email server, for example, by using a suitable user name and password associated with the work email server.

When the mobile terminal 100 is moved to location 2, for example, a home location for the user, the location detector 120 detects suitable coordinates, and identifies the home location. Then, the mobile terminal 100 performs mobile communication in association with a configuration profile for the home location. In an example, the mobile terminal 100 determines a preferred cell in association with the home location. Then, the mobile terminal 100 registers with a based station of the preferred cell in association with the home location to camp on to a preferred PLMN. The preferred PLMN can be the same PLMN as at the work place or can be a different PLMN from the work place. In another example, the mobile terminal 100 performs a neighbor cell measurement in association with the home location. In another example, the mobile terminal 100 performs an interference noise cancellation in association with the home location. In another example, the mobile terminal 100 associates itself with a home access point, and provides appropriate password codes for the home access point.

Additionally, the mobile terminal 100 can adjust application-level configurations in association with the home location, such as selecting and loading different software packages for use at home. For example, in accordance with an embodiment, the mobile terminal 100 is configured to forward calls to a desktop home phone, activate email notifications, and the like, to adapt to the home location. In another example, at home, the mobile terminal 100 selects a home email server, and accesses the home email server, for example, using appropriate user name and password.

The mobile terminal 100 can improve user experience. In an example, the mobile terminal 100 stores a network topology. The network topology associates cells with locations. The locations include a flight destination. The network topology associates a cell with the flight destination. It is noted that the network topology can be provided, by any suitable agency, such as a PLMN agency, or can be learned by the mobile terminal 100.

In accordance with an embodiment, the mobile terminal 100 initiates mobile communication at the flight destination based on the network topology. More specifically, the user turns off the mobile terminal 100 on a flight to the flight destination. When the user lands on the flight destination and turns on the mobile terminal 100, the location detector 120 detects the flight destination. Then, the mobile terminal 100 determines the cell associated with the flight destination based on the network topology. Subsequently, the mobile terminal 100 registers with a base station of the cell to camp on a preferred PLMN to start mobile communication.

It is noted that the network topology can specify a plurality of cells in association with the flight destination. In this case, the mobile terminal 100 attempts to register to one of the plurality of cells to camp on a PLMN to start mobile communication. The mobile terminal 100 can use any suitable algorithm to select the preferred cell for camping. It is also noted that cells at one location can belong to different PLMNs. In addition, the mobile terminal 100 can selectively camp on different PLMNs at different locations.

The mobile terminal 100 can start the mobile communication in a reduced time comparing to a blind-search setup. In the blind-search setup example, a mobile terminal scans all the bands that are supported by the mobile terminal, and sorts them in a descending order based on signal strength. Then, the mobile terminal attempts to synchronize to a frequency having the strongest signal strength to receive a broadcast signal of a cell. The broadcast signal can include cell information. Based on the cell information, the mobile terminal determines whether the cell is suitable for camping on a PLMN. The blind-search setup may take a noticeable time by the user, such as several seconds.

The mobile terminal 100 can also be configured to reduce a power consumption based on the stored network topology. In an example, when the mobile terminal 100 starts the mobile communication in a reduced time, the mobile terminal 100 saves power in communication initialization. In another example, the mobile terminal 100 saves power in neighbor cell measurements. Specifically, the network topology can be used to determine neighbor cells at a location. Generally, a neighbor cell measurement is performed from time to time, for example, to prepare for handover. The neighbor cell measurement consumes power. The mobile terminal 100 can be configured to determine the neighbor cells based on the network topology, and reduce the time to make the neighbor cell measurement. Thus, the mobile terminal 100 can have a reduced power consumption.

Further, the mobile terminal 100 can be configured to improve a mobile communication quality based on the stored network topology. Specifically, the network topology can be used to determine neighbor cells at a location. The neighbor cells can introduce noise interferences. The mobile terminal 100 can be suitably configured to cancel or reduce the noise interferences by the neighbor cells. Thus, the mobile communication quality can be improved.

In another example, location 1 has a first printer, and location 2 has a second printer that is different from the first printer. The mobile terminal 100 stores printing configurations in association with locations. When the mobile terminal 100 detects that it is at location 1 (e.g., within range of the first printer), the mobile terminal 100 changes the printing configuration according to the first printer. When the mobile terminal 100 detects that it is at location 2 (e.g., within range of the second printer), the mobile terminal 100 changes the printing configuration according to the second printer.

Figure 2:
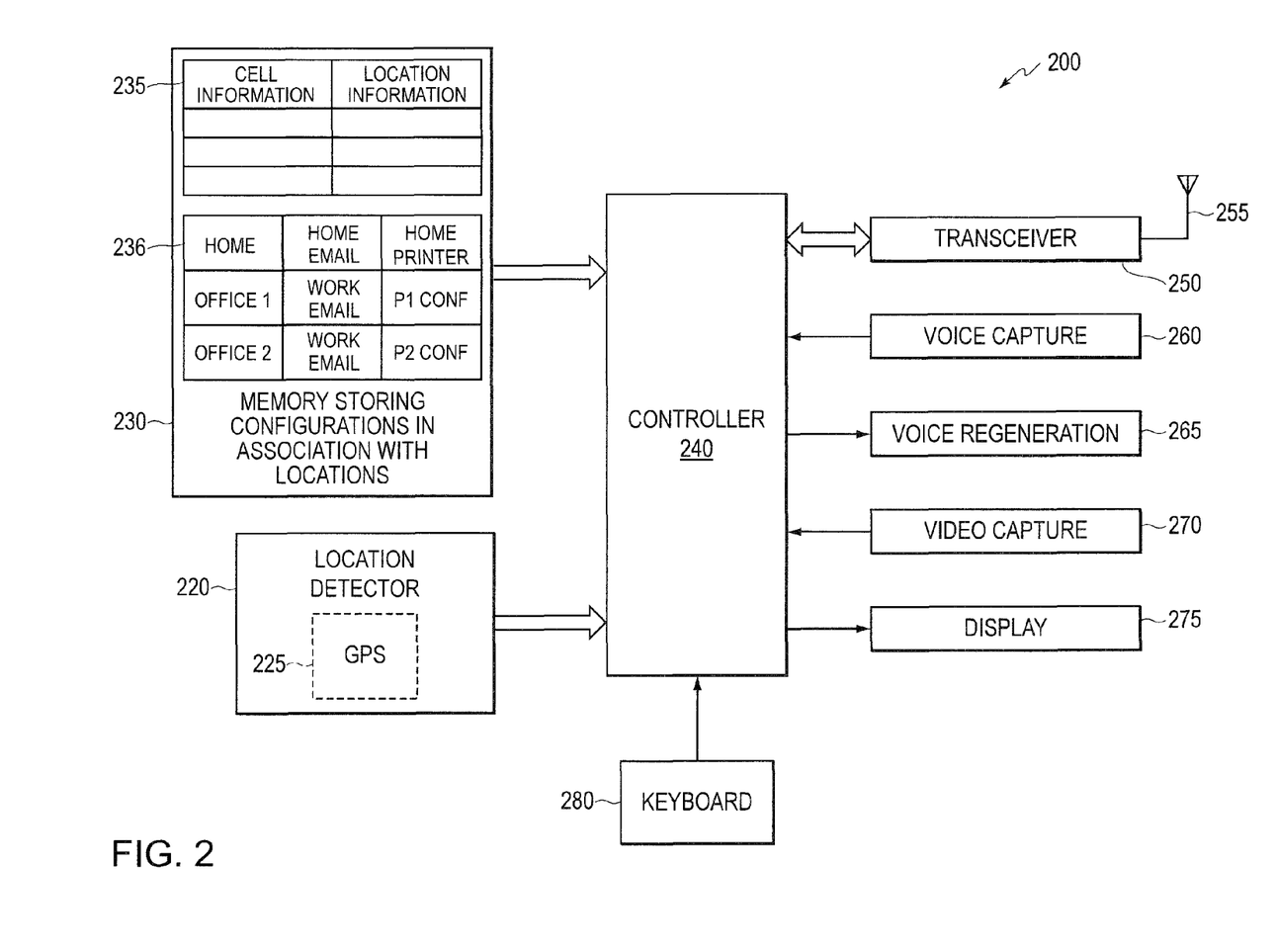
FIG. 2 shows a block diagram of a mobile terminal example according to an embodiment of the disclosure.

FIG. 2 shows a block diagram of a mobile terminal example 200 according to an embodiment of the disclosure. The mobile terminal 200 includes a location detector 220, a memory unit 230, a controller 240, a transceiver 250, an antenna 255, a voice capture unit 260, a voice regeneration unit 265, a video capture unit 270, a display unit 275 and a keyboard unit 280. These elements are coupled together as shown in FIG. 2.

The location detector 220 includes any suitable unit to detect the location of the mobile terminal 200. In an embodiment, the location detector 220 includes a global positioning system (GPS) unit 225. The GPS unit 225 is switched on to receive satellite signals, and to detect the location of the mobile terminal 200 based on the received satellite signals. Then, the GPS unit 225 can be switched off to save power. In another embodiment, the location detector 220 can detect the location from network, for example, based on mobile phone measurement and network processing, triangulation of fixed transmission stations and other suitable location determination methods. In another embodiment, the location information is supplied over a wireless interface, such as BLUETOOTH, by another device (not shown) that has a GPS unit.

The memory unit 230 stores various configurations, profiles, setups, and the like, in association with locations. In an example, the memory unit 230 includes a look-up table 235 to store a network topology. The look-up table 235 includes a plurality of entries. Each entry includes cell information and location information corresponding to a cell. The cell information includes a cell identification (ID), a radio frequency, and the like. The location information can include, for example, a base station location and a radio radius. Alternatively, the location information can include a plurality of location points within the radio zone of the cell.

In another example, the memory unit 230 includes an application configuration table 236. The application configuration table 236 can store application configurations in association with locations. For example, the application configuration table 236 includes a home entry, a first office entry, and a second office entry. The home entry includes application configurations for home, such as software packages, email server information for home, call forwarding configuration for home, printing configuration for home, and the like. The first office entry corresponds to a first office room having a first printer P1. Then, the first office entry includes a printing configuration corresponding to the first printer P1. The second office entry corresponds to a second office room having a second printer P2. Then, the second office entry includes a printing configuration corresponding to the second printer P2. In an embodiment, the printers are wireless enabled printers, and the mobile terminal 200 has printable data, for example, a picture file that has been photographed by a camera integrated into the mobile terminal 200.

The transceiver 250 includes a transmitter portion and a receiver portion. The receiver portion receives a radio frequency signal and down-converts the radio frequency signal to an intermediate frequency signal or a base-band frequency signal for further processing. The transmitter portion up-converts a base-band signal into a radio frequency signal.

The antenna 255 generates electrical signals in response to the electromagnetic signals in the air and provide the electrical signals to the receiver portion of the transceiver 250. In addition, the antenna 255 emits electromagnetic signals into the air in response to electrical signals provided by the transmitter portion of the transceiver 250.

The voice capture unit 260 generates electrical signals in response to sound waves, and converts the electrical signals to digital streams for further processing. The voice regeneration unit 265 regenerates sound waves based on electrical signals. The video capture unit 270 generates electrical signals in response to light waves, and converts the electrical signals to digital streams for further processing. The display unit 275 generates visual images to the user. The keyboard unit 280 receives instructions from the user.

The controller 240 determines an operational configuration based on a detected location, and the stored operational configurations in association with locations. In addition, the controller 240 configures the various components of the mobile terminal 200 according to the determined operational configuration.

It is noted that the controller 240 can be implemented as a processor core executing suitable software or firmware instructions, or can be implemented by suitable hardware, such as application specific integrated circuit (ASIC).

In an example, the mobile terminal 200 is switched on. The GPS 225 is triggered on by the switching event, detects a present location of the mobile terminal 200, and provides the detected present location to the controller 240. The controller 240 accesses the network topology stored in the look-up table 235. Based on the network topology, the controller 240 determines a plurality of cells in association with the detected present location. Further, the controller 240 suitably configures the transceiver 250 to set up a radio connection with one of the plurality of cells. Via the radio connection, the mobile terminal 200 registers with the one cell, and camps on a PLMN to start mobile communication.

In another example, the memory unit 230 stores application level configurations, such as a call forwarding configuration, an email notification configuration, a ring tone configuration, and the like, in association with locations. When a present location is detected, the controller 240 accesses the memory unit 230 to determine the application level configurations in association with the present location. Then, the mobile terminal 200 loads and/or executes applications according to the determined application level configurations.

Figure 3:
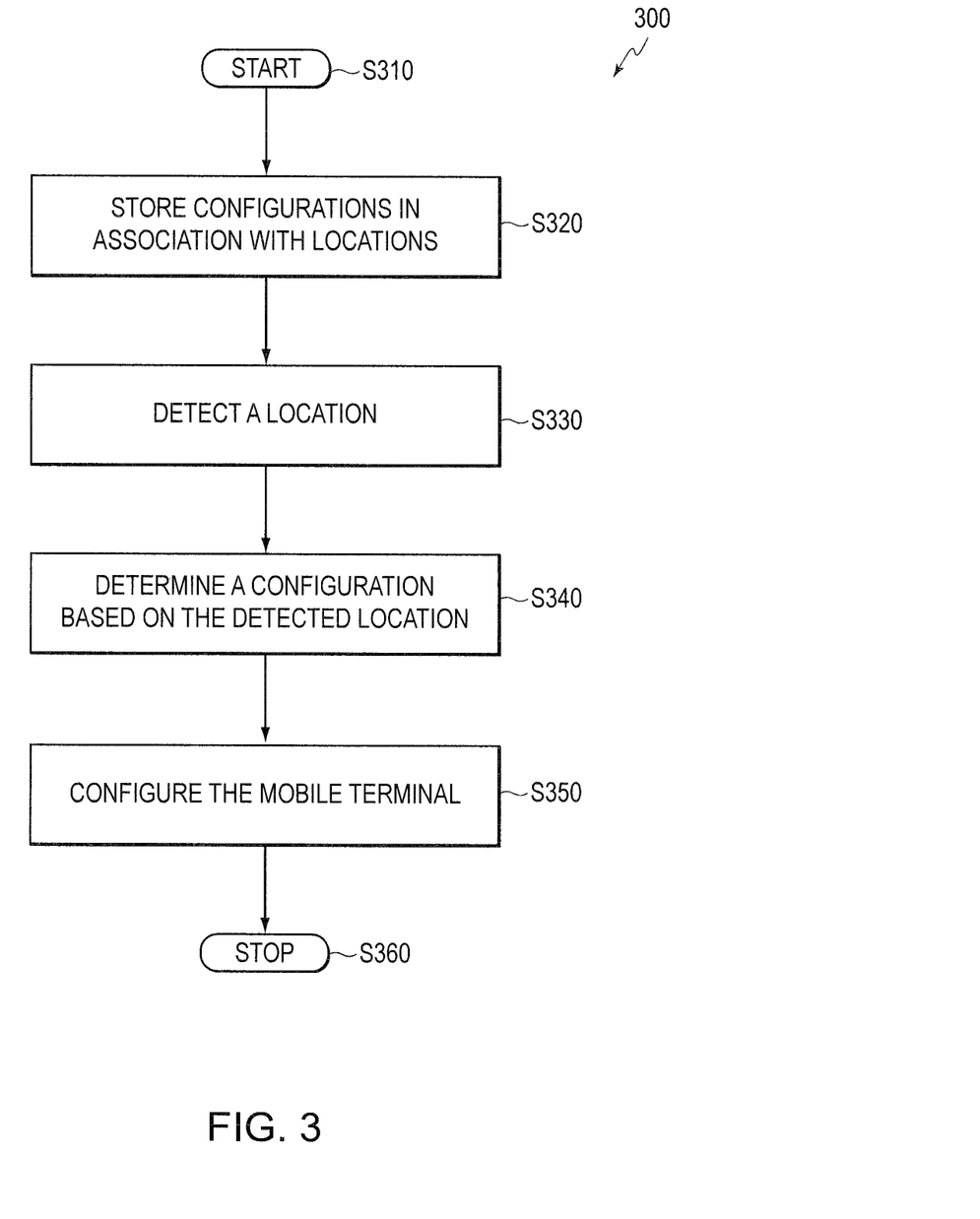
FIG. 3 shows a flow chart outlining a process example for configuring a mobile terminal according to an embodiment of the disclosure.

FIG. 3 shows a flow chart outlining a process example 300 according to an embodiment of the disclosure. The process 300 is executed by a mobile terminal, such as the mobile terminal 200, to configure mobile communications based on location detection. The process starts at S310, and proceeds to S320.

In S320, the mobile terminal stores operational configurations in association with locations. In an embodiment, the mobile terminal stores a network topology. The network topology associates cells with locations. In an example, the network topology is stored in a look-up table. The look-up table includes a plurality of entries corresponding to a plurality of cells respectively. An entry includes cell information and location information corresponding to a cell. The cell information includes an identification for the cell, a communication frequency by the cell, and the like. The location information specifies, for example, a base station location of the cell, and a radio radius of the cell. Alternatively, the location information includes a plurality of location points within the cell.

In another embodiment, the mobile terminal stores application features in association with locations. In an example, the mobile terminal stores user applications that are to be loaded, enabled or disabled at a particular location. For instance, specific applications for use at work are stored in association with a work location, while other specific applications for use at home are stored in association with a home location. In another example, the mobile terminal stores a power configuration in association with locations, such as a power saving mode at home, and the like. In another example, the mobile terminal stores application configurations in association with locations. Application configurations include, for instance, an email configuration, for activating email notification at home, a frequency for receiving work emails when at home, a frequency for receiving work emails when at work, and the like. In another example, the mobile terminal stores a call forwarding configuration in association with locations, such as forwarding calls to a home phone at home, forwarding calls to a work phone at work, and the like. Additionally, the mobile terminal stores a ring tone configuration, a vibration configuration, and the like, in association with locations. It is noted that the above configurations are examples and any suitable application configurations can be stored. Then, the process proceeds to S330.

In S330, the mobile terminal detects a present location. In an embodiment, the mobile terminal includes a GPS unit. The GPS unit can be turned on periodically, or can be turned on based on events. When the GPS unit is turned on, the GPS unit receives satellite signals, and determines a present location based on the received satellite signals. Any suitable location determination mechanism, such as location determination based on triangulation of radio transmission towers, may be employed. The process then proceeds to S340.

In S340, the mobile terminal determines an operational configuration based on the detected present location. In an example, based on stored configurations for a detected location, the mobile terminal searches the network topology to determine a cell for camping on a PLMN at the present location and neighbor cells of the present location. In addition, the mobile terminal determines a neighbor cell interference cancellation configuration that can reduce interference noises at the present location.

In another example, the mobile terminal determines one or more of a power configuration, an email configuration, a call forwarding configuration, a carrier configuration, a ring tone configuration, and the like, based on the detected location. Then, the process proceeds to S350.

In S350, the mobile terminal configures its mobile communication and applications based on the determined operational configuration. In an example, the mobile terminal synchronizes to a frequency of the determined cell, and register with a base station of the cell to camp on a PLMN. In another example, the mobile terminal measures signal strengths from the neighbor cells, and determines to handover to a neighbor cell based on the measurement. In another example, the mobile terminal is configured according to the neighbor cell interference cancellation configuration to reduce the interference noises at the present location.

In another example, the mobile terminal changes various application features according to the various configuration determined based on the present location, such as switching to a power save mode at home, activating an email notification at home, forwarding calls to a home phone at home, and the like. Then, the process proceeds to S360, and terminates.

It is noted that the network topology can be provided by any suitable agency, such as a service carrier. In an example, the service carrier pre-stores the network topology in the mobile terminal before the mobile terminal is sold to a user. In another example, the service carrier sends the network topology, or an update of the network topology to the mobile terminal upon receiving a request from the mobile terminal.

Alternatively, the mobile terminal can learn the network topology from previous communication experiences at the locations, and can update the network topology from present communication experiences at a location.

Figure 4:
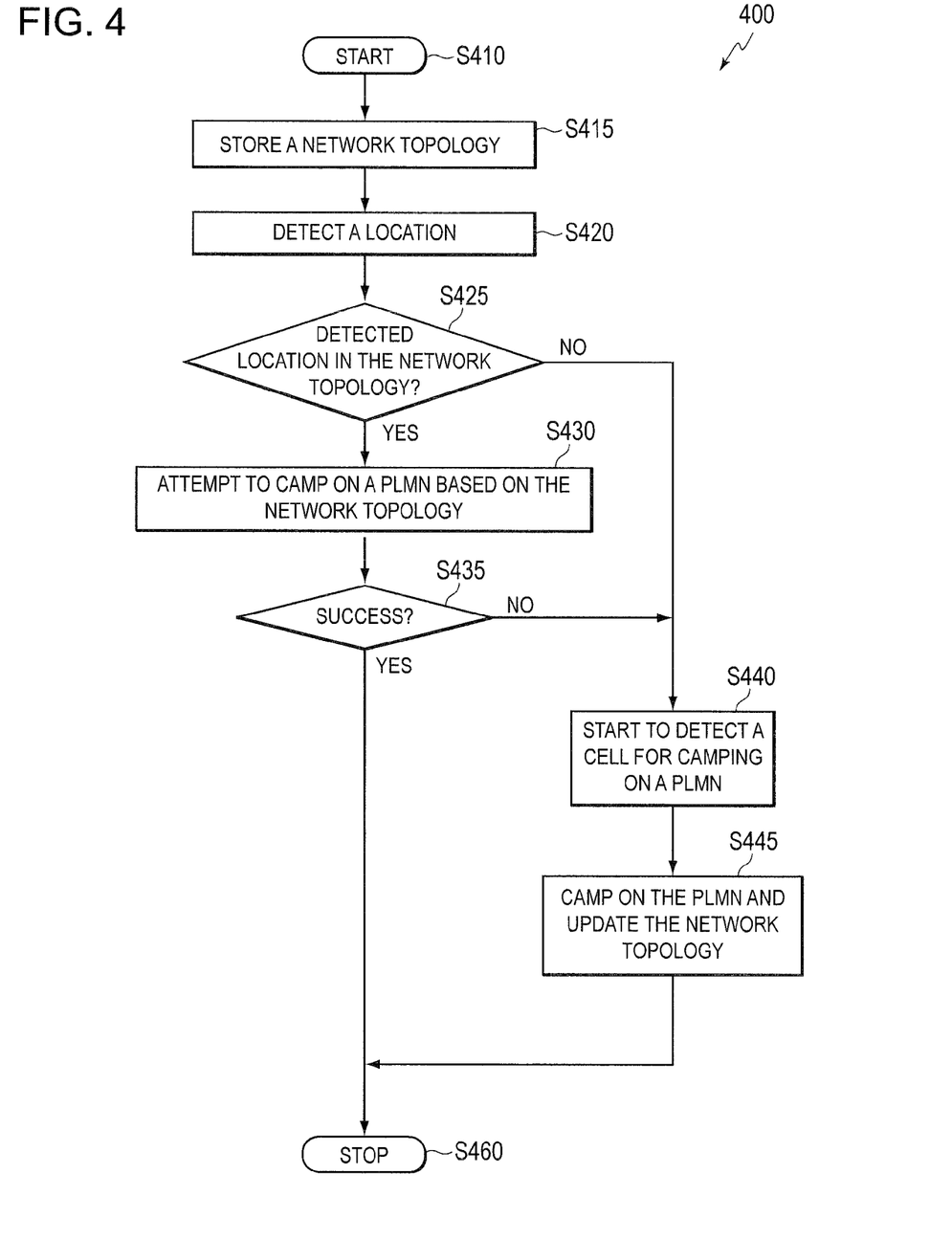
FIG. 4 shows a flow chart outlining a process example for a mobile terminal to camp on a public land mobile network (PLMN) according to an embodiment of disclosure.

FIG. 4 shows a flow chart outlining a process example 400 according to an embodiment of the disclosure. The process 400 is executed by a mobile terminal, such as the mobile terminal 200, to camp on a PLMN to start mobile communication. The process starts at S410, and proceeds to step S415.

In S415, the mobile terminal stores a network topology. The network topology associates cells with locations. In an example, the network topology is stored in a look-up table. The look-up table includes a plurality of entries corresponding to a plurality of cells respectively. An entry includes cell information and location information corresponding to a cell. The cell information includes an identification for the cell, a communication frequency by the cell, and the like. The location information can specify a base station location of the cell, and a radio radius of the cell. Alternatively, in accordance with an embodiment, the location information includes a plurality of location points within the cell. Then, the process proceeds to S420.

In S420, the mobile terminal detects a present location. In an embodiment, the mobile terminal includes a GPS unit. The GPS unit can be turned on periodically, or can be turned on based on events, such as the mobile terminal being switched on. When the GPS unit is turned on, the GPS unit receives satellite signals, and determine a present location based on the received satellite signals. The process then proceeds to S425.

In S425, the mobile terminal determines whether the detected present location is in the network topology. In the look-up table example, the mobile terminal searches the look-up table to find whether the present location is within the location information of an entry. When the present location is within the location information of an entry, the process proceeds to S430; otherwise the process proceeds to S440.

It is noted that the present location may not be an exact point in the location information, but can be within a predetermined distance to the points in the location information.

In S430, the mobile terminal attempts to camp on a PLMN based on the network topology and the detected present location. More specifically, the mobile terminal determines a plurality of cells that can provide radio connections to the present location based on the network topology. In the look-up table example, the location information of each of the plurality of cells includes the present location. Subsequently, the mobile terminal attempts to camp on a PLMN via one of the plurality of cells. The mobile terminal orders the plurality of cells, and attempts to camp on a PLMN according to the order. The process then proceeds to S435.

In S435, the mobile terminal determines whether the attempt to camp on a PLMN is successful. When the mobile terminal successfully registers with a base station to camp on a PLMN, the process proceeds to S460 and terminates; otherwise, the process proceeds to S440.

In S440, the mobile terminal starts to detect a cell for camping on a PLMN at the present location. The mobile terminal can use any suitable algorithms, techniques to find the cell. In an example, the mobile terminal scans frequency bands that are supported by the mobile terminal. Then, the mobile terminal sorts the frequency bands based on received signal strength at the frequency bands, for example, in a descending order. Subsequently, the mobile terminal attempts to synchronize to a frequency band according to the descending order to receive a broadcast signal from a cell using the frequency band. When the broadcast signal indicates the cell is not suitable for camping on a PLMN, the mobile terminal switches to a next frequency band in the descending order. When the broadcast signal indicates the cell is suitable for camping on a PLMN, the mobile terminal has successfully detected the cell. Then, the process proceeds to S445.

In S445, the mobile terminal camps on the PLMN via the detected cell, and updates the network topology to associate the detected cell with the present location. Then, the process proceeds to S460 and terminates.

It is noted that the mobile terminal can be configured to detect a plurality of cells that are suitable for camping on a PLMN at the present location and can update the network topology to associate the detected plurality of cells with the present location.

Figure 5:
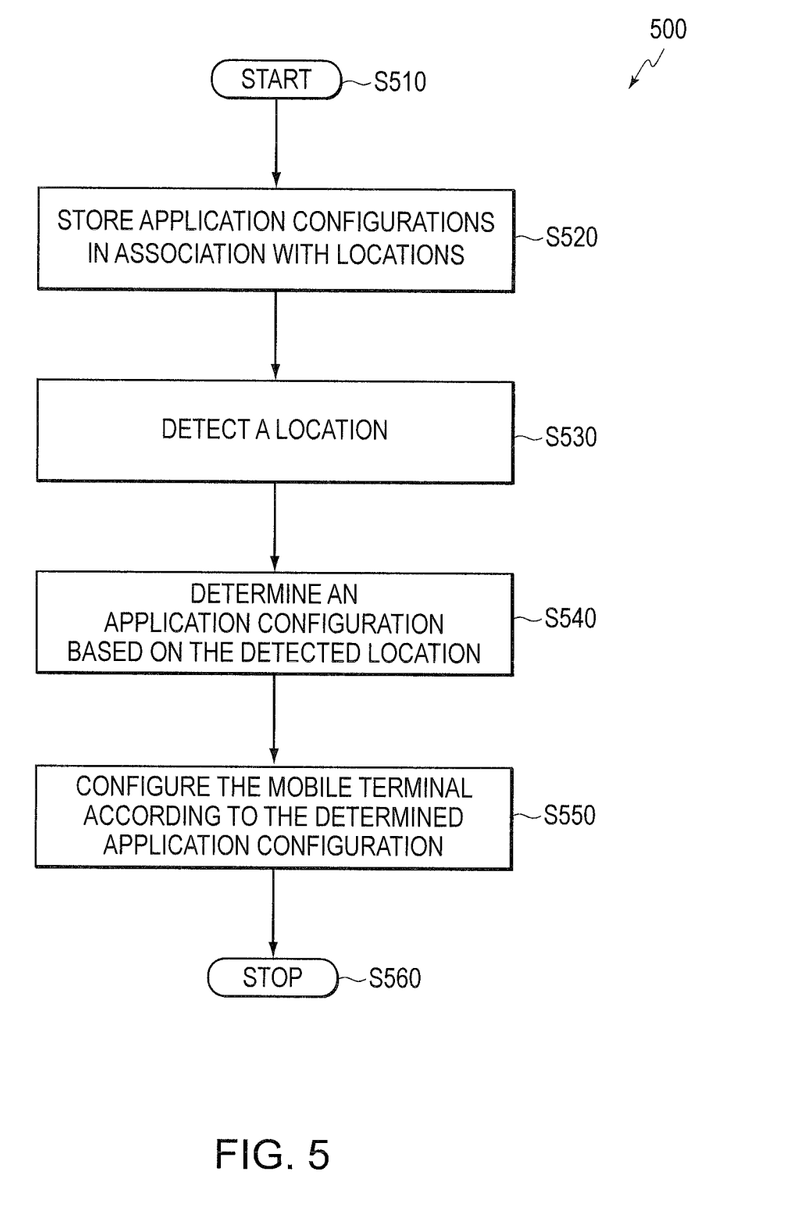
FIG. 5 shows a flow chart outlining a process example for configuring applications of a mobile terminal according to an embodiment of the disclosure.

FIG. 5 shows a flow chart outlining a process example for configuring applications of a mobile terminal according to an embodiment of the disclosure. The process 500 is executed by a mobile terminal, such as the mobile terminal 200, to configure applications, such as email configuration, ring tones, call forwarding, printing configurations, and the like, based on location detection.

At S520, the mobile terminal stores various application configurations in association with locations. In an example, the mobile terminal stores a power configuration in association with locations, such as a power saving mode at home, and the like. In another example, the mobile terminal stores a selection of software applications in association with locations. In another example, the mobile terminal stores a configuration of a selected software application in association with locations. More specifically, the mobile terminal stores configuration profiles for applications to be loaded, closed, enabled and disabled in association with locations, for instance, a work specific application profile indicating applications to be loaded and enabled when at work, and home specific profile indicating applications to be loaded and enabled when at work; in an embodiment, each of the profiles additionally indicates applications to be automatically disabled or closed at various locations in order to reduce resource usage. In another example, the mobile terminal stores a selection of hardware components in association with locations. In another example, the mobile terminal stores email configurations in association with locations, such as activating email notification at home, connecting to a home email server at home, connecting to an office email server at work, and the like. In another example, the mobile terminal stores call forwarding configurations in association with locations, such as forwarding calls to a home phone at home, forwarding calls to an office phone at work, and the like. In another example, the mobile terminal stores printing configurations in association with locations, such as black-white printing at a first office room, color printing at a second office room, and the like. Additionally, the mobile terminal stores a ring tone configuration, a vibration configuration, a user preference, and the like, in association with locations.

At S530, the mobile terminal detects a present location. In an embodiment, the mobile terminal includes a GPS unit or other suitable location detection mechanisms, such as triangulating the known locations of transmission towers. The GPS unit can be turned on periodically, or can be turned on based on events. When the GPS unit is turned on, the GPS unit receives satellite signals, and determines a present location based on the received satellite signals. In another embodiment, the mobile terminal does not have a GPS unit, but can detect the present location from a mobile network. For example, the mobile terminal receives GPS information over a wireless connection or a BLUETOOTH connection. The GPS information can be sent by a nearby device that has a GPS unit. In another example, the mobile terminal is registered in a network. The mobile terminal measures radio signals, and detects the present location based on the radio signal measurement. In another example, a base station or a nearby device detects a location based on either satellite signals or radio signals, and sends the detected location to the mobile terminal.

At S540, the mobile terminal determines an application configuration based on the detected present location. In an example, the mobile terminal determines a power configuration, an email configuration, a call forwarding configuration, a carrier configuration, a ring tone configuration, a printing configuration, and the like, based on the detected location.

At S550, the mobile terminal is configured based on the determined application configuration. In an example, the mobile terminal switches to a power save mode at home. In another example, the mobile terminal selects and loads different software packages at home. In another example, the mobile terminal connects to a home email server at home, and connects to an office email server at work. In another example, the mobile terminal changes to a high resolution printing when the mobile terminal enters a room having a high speed printer, and changes to a low resolution printing when the mobile terminal enters a room having a slow printer. In another example, the mobile terminal activates an email notification, forwards calls to a home phone when the mobile terminal is at home. In another example, the mobile terminal loads different software packages at different locations.

It is noted that the process 500 can be performed when the mobile terminal already camps on a PLMN or at the time the mobile terminal starts to camp on a PLMN. In an example, the mobile terminal periodically detects the present locations, and changes the application configurations accordingly.

While the invention has been described in conjunction with the specific embodiments thereof that are proposed as examples, it is evident that many alternatives, modifications, and variations will be apparent to those skilled in the art. For example, while the above description is provided in the context of a mobile terminal that is suitable for mobile communication, various aspects are suitable for implementation of other mobile devices, such as laptop computers, personal data assistants, and the like. Accordingly, embodiments of the invention as set forth herein are intended to be illustrative, not limiting. There are changes that may be made without departing from the spirit and scope of the invention.

What is claimed is:

1. A method for operating a mobile terminal, comprising:
storing application configurations in association with locations in the mobile terminal, the application configurations including at least a communication configuration that configures a power save mode of the mobile terminal, a selected software application to run on the mobile terminal, an email configuration for a frequency of receiving emails, and a ring tone;
detecting a location of the mobile terminal;
determining an application configuration from among the application configurations that are stored in the mobile terminal, based on the detected location; and
configuring the mobile terminal according to the determined application configuration.

2. The method of claim 1, wherein storing the application configurations in association with locations in the mobile terminal comprises at least one of:
storing a selection of email servers in association with locations;
storing a printing configuration in association with locations; and
storing a call forwarding configuration in association with locations.

3. The method of claim 1, wherein detecting the location of the mobile terminal further comprises at least one of:
receiving the location of the mobile terminal from another device; and
receiving a global positioning system (GPS) signal and detecting the location based on the GPS signal.

4. A method for operating a mobile terminal, comprising:
storing operational configurations in association with locations in the mobile terminal, the operational configurations including at least a communication configuration that configures a power save mode of the mobile terminal, a selected software application to run on the mobile terminal, an email configuration for a frequency of receiving emails, and a ring tone;
detecting a location of the mobile terminal;
determining an operational configuration from among the operational configurations that are stored in the mobile terminal, based on the detected location; and
configuring the mobile terminal according to the determined operational configuration.

5. The method of claim 4, wherein storing the operational configurations in association with the locations further comprises:
storing a network topology that associates cells with the locations.

6. The method of claim 5, wherein determining the operational configuration based on the detected location, further comprises:
determining a cell for camping on a public land mobile network (PLMN) based on the network topology.

7. The method of claim 6, wherein configuring the mobile terminal according to the determined operational configuration, further comprises:
synchronizing to a frequency of the determined cell; and
registering with the determined cell to camp on the PLMN.

8. The method of claim 5, wherein determining the operational configuration based on the detected location, further comprises at least one of:
determining a service carrier based on the network topology;
determining a neighbor cell based on the network topology; and
determining a neighbor cell interference cancellation configuration based on the network topology.

9. The method of claim 5, wherein storing the network topology associating the cells with the locations further comprises at least one of:
receiving the network topology from a service carrier; and
detecting a cell at the detected location and updating the network topology with the detected cell and the detected location.

10. The method of claim 5, wherein storing the network topology that associates the cells with the locations, further comprises:
 storing the cells and the associated locations in a look-up table.

11. The method of claim 4, wherein detecting the location of the mobile terminal further comprises at least one of:
 receiving the location of the mobile terminal from another device; and
 receiving a global positioning system (GPS) signal and detecting the location based on the GPS signal.

12. A mobile terminal, comprising:
 a memory unit configured to store operational configurations in association with locations, the operational configurations including at least a communication configuration that configures a power save mode of the mobile terminal, a selection of software applications, a selection of email servers, an email configuration for a frequency of receiving emails, a printing configuration, a call forwarding configuration, and a ring tone;
 a location detector configured to detect a location of the mobile terminal; and
 a controller configured to determine an operational configuration from among the operational configurations that are stored in the mobile terminal, based on the detected location, and to configure the mobile terminal according to the determined operational configuration.

13. The mobile terminal of claim 12, wherein the memory unit is configured to store a network topology associating cells with the locations.

14. The mobile terminal of claim 13, further comprises:
 a transceiver module to receive and transmit radio signals.

15. The mobile terminal of claim 14, wherein the controller is configured to determine a cell for camping on a public land mobile network (PLMN) based on the network topology, and configure the transceiver module to receive radio signals from the determined cell and transmit radio signals to the determined cell.

16. The mobile terminal of claim 14, wherein the controller is configured to determine at least one of a service carrier, a neighbor cell and a neighbor cell interference cancellation configuration, based on the network topology.

17. The mobile terminal of claim 14, wherein the transceiver is configured to frequency-scan at the location to detect a plurality of frequencies used by a plurality of cells, synchronize to a frequency used by a cell to receive cell information and the controller is configured to determine the cell for camping on a public land mobile network (PLMN) based on the received cell information, and update the network topology stored in the memory unit with the determined cell and the location.

18. The mobile terminal of claim 13, wherein the memory unit further comprises a look-up table for storing the cells and the associated locations.

19. The mobile terminal of claim 12, wherein the location detector further comprises:
 a receiver configured to receive the location of the mobile terminal from another device.

20. The mobile terminal of claim 12, wherein the location detector further comprises:
 a global positioning system (GPS) configured to detect the location based on received satellite signals.

* * * * *